US007995312B2

(12) United States Patent
Bock et al.

(10) Patent No.: US 7,995,312 B2
(45) Date of Patent: Aug. 9, 2011

(54) ELECTRIC FAULT CURRENT LIMITER HAVING SUPERCONDUCTING ELEMENTS INSIDE A CRYOGENIC VESSEL AND BUSHINGS FOR CONNECTING AN EXTERNAL CIRCUIT

(75) Inventors: Joachim Bock, Erftstadt (DE); Frank Breuer, Bonn (DE); Werner Kohler, Berlin (DE)

(73) Assignee: Nexans, Paris (FR)

( * ) Notice: Subject to any disclaimer, the term of this patent is extended or adjusted under 35 U.S.C. 154(b) by 291 days.

(21) Appl. No.: 12/011,769

(22) Filed: Jan. 29, 2008

(65) Prior Publication Data

US 2008/0232014 A1 Sep. 25, 2008

(30) Foreign Application Priority Data

Feb. 16, 2007 (EP) .................................... 07300797

(51) Int. Cl.
*H02H 9/00* (2006.01)
*H01B 17/26* (2006.01)
*H01B 12/00* (2006.01)
*H02G 15/34* (2006.01)

(52) U.S. Cl. ....... 361/19; 174/15.3; 174/15.4; 174/15.5; 505/885

(58) Field of Classification Search .................... 361/19; 174/15.3, 15.4, 15.5; 505/885
See application file for complete search history.

(56) References Cited

U.S. PATENT DOCUMENTS 4,045,634 A * 8/1977 Nakano et al. .................. 218/75
4,074,064 A * 2/1978 Muller et al. ................... 174/28
4,544,979 A * 10/1985 Ennis et al. ..................... 361/19
4,695,675 A * 9/1987 Yamamoto ................... 174/15.4
4,841,268 A * 6/1989 Burnett et al. ................ 335/216
4,994,932 A 2/1991 Ocamoto et al. ................ 361/19
5,861,574 A * 1/1999 Kotani et al. ................ 174/15.4
2002/0040583 A1* 4/2002 Barclay et al. ................... 62/3.1
2003/0154727 A1* 8/2003 Ashibe et al. .................. 62/45.1
2005/0204751 A1 9/2005 White et al. ................... 62/51.1

FOREIGN PATENT DOCUMENTS

JP 2004303811 3/2003
JP 2004303811 A * 10/2004

OTHER PUBLICATIONS

European International Search Report—Jun. 8, 2007.

* cited by examiner

*Primary Examiner* — Jared J Fureman
*Assistant Examiner* — Scott Bauer
(74) *Attorney, Agent, or Firm* — Sofer & Haroun, LLP

(57) ABSTRACT

Electric fault current limiter has superconducting elements inside a cryogenic vessel and bushings for connecting an external circuit. The electric fault current limiter (1) includes a cryogenic vessel (2) and superconducting assemblies (5) including high temperature type superconducting elements (HTSC) immersed in a liquid coolant (6) such as liquefied nitrogen. Bushings (25, 28) with conductors (17, 18) are associated with a main body (3) of the vessel (2) such that the conductors (17, 18) extend horizontally from a surrounding space into an ullage space (8) situated between a level (7) of the liquid coolant (6) inside the vessel (2) and a cover (4). The arrangement of the bushings (25, 28) according to the invention allows for removing the cover (4) without dismantling electrical connections between the current limiter (1) and a circuit to be protected as is necessary with prior art limiters.

4 Claims, 3 Drawing Sheets

ELECTRIC FAULT CURRENT LIMITER HAVING SUPERCONDUCTING ELEMENTS INSIDE A CRYOGENIC VESSEL AND BUSHINGS FOR CONNECTING AN EXTERNAL CIRCUIT

RELATED APPLICATION

This application claims the benefit of priority from European Patent Application EP 07 300 797.3, filed on Feb. 16, 2007, the entirety of which is incorporated herein by reference.

DESCRIPTION

Field of the Invention

The invention relates to an electric current limiter comprising a cryogenic vessel enclosing an inner space with the superconducting elements and the cryogenic liquid for cooling the superconducting elements.

BACKGROUND

In general, a cryogenic assembly is described in WO 03/044424 A2 for cooling superconducting elements, said cryogenic assembly being suitable for a plurality of low temperature applications such as magnetic resonance imaging, superconducting transformers, fault current limiters etc.

The superconducting elements are housed in an interior vessel filled with the cryogenic medium, i.g. liquid helium. The interior vessel is enclosed in a cryostat with an insulating evacuated intermediate space defined by the outer wall of the cryostat housing and the outer wall of said interior vessel.

For electrical connection of the superconducting elements with the warm surrounding of the cryostat a neck tube is provided extending from the interior vessel into the evacuated intermediate space of the cryostat. Further, insulated external terminals are provided in the outer wall of the cryostat for allowing passage of an electric cable for electric connection of the neck tube with the warm surrounding of the cryostat. By this assembly electrical connection of the superconducting elements within the interior vessel with the warm surrounding of the cryostat is possible via the neck tube without the need of opening of the neck tube which is to be avoided in order not to admit air to the interior vessel.

In particular, the present invention relates to an electric current limiter comprising

- a cryogenic vessel having a main body and a cover, both defining an inner space separated from a surrounding space,
- superconducting elements of the HTSC type immersed in a cryogenic liquid contained in the inner space of the vessel,
- an ullage space between the cryogenic liquid an the cover,
- and bushings with conductors extending from the inner space of the vessel to the surrounding space, the conductors connecting the superconducting elements with a current path to be protected against a fault current.

A current limiter of the HTSC-type mentioned before, where HTSC stands for High Temperature Superconductor, is described in a publication entitled "Fault current limiter in medium and high voltage grids" by Dr.-Ing. Martin Kleimaier and Prof. Dr.-Ing. Claus Neumann that was presented at "IEA Workshop on Electricity Transmission and Distribution Technology and R&D" in Paris, France, on 4-5 Nov. 2004. Also in this publication there is described the technical background for understanding the general purpose and the considerable value of current limiters in transmission and distribution networks.

The cryogenic vessel of the superconducting current limiter according to the publication mentioned above is closed to the surrounding atmosphere by a cover that carries all the elements necessary for the operation of the device such as pipes for transferring a cooling liquid into the vessel for maintaining the superconducting state and bushings having conductors for the connection of the superconducting elements inside the vessel to an external circuit which is to be protected against a fault current. In case the current limiter has to undergo inspection or service work at least all electrical connections between the conductors of the bushings and the external circuit have to be dismantled prior to removing the cover of the cryogenic vessel. This is necessary in contrast to pipes or hoses used for carrying the cooling liquid which can be made from flexible material because conductors adapted to a high fault current are exposed to considerable mechanical forces and thus can only be designed as solid parts.

OBJECT AND SUMMARY

Considering the situation described before it is the aim of the invention to make integration of a superconducting current limiter into existing or new substations or switchgear and related service work much simpler.

According to the invention the bushings are positioned in an area of the main body of the vessel surrounding the ullage space underneath the cover. This means that removing the cover of the cryogenic vessel does not necessitate dismantling of electrical connections and is not complicated by the weight of the bushings and their associated conductors.

The invention can be put into practice in a number or favourable ways both for indoor and outdoor substations or switchgear.

In a first embodiment of the invention the bushings are positioned in opposed wall parts of the main body of the cryogenic vessel and that the conductors of the bushings extend horizontally into the ullage space. This design provides aligned electrical connecting facilities favourable for all conceivable applications of the current limiter.

On the other hand it may be desirable to maintain the position or orientation of electrical connecting facilities of prior art devices. This can be achieved according to a further embodiment of the invention which is characterized by the feature that the wall parts of the main body are designed as cylindrical extensions housing the bushings and that a flange is provided at the end of each extension for coupling ongoing electrical equipment. The cross section of the extensions may preferably be cylindrical, but other forms may be chosen if appropriate.

In high voltage systems it is known to use transmission lines having towers and conductors positioned in normal atmospheric air and to use gas-insulated equipment with small dimensions for switching and distribution purposes. According to a further embodiment of the invention the current limiter can be used as a coupling and protecting element in systems employing different types of insulation. This can be achieved by the fact that the flange of one of the extensions is adapted to a component for outdoor use and the flange of the other extension is adapted to indoor equipment. In all of the mentioned embodiments bushings of a disk-type design having a concentrically arranged inner conductor may be used. Examples of bushings suitable for the purposes of the invention are described in DE 23 60 071 C2 and DE 28 48 560 C2.

BRIEF DESCRIPTION OF THE DRAWINGS

The invention will now be explained in more detail with reference to the drawings, in which.

DETAILED DESCRIPTION

Figure 1:
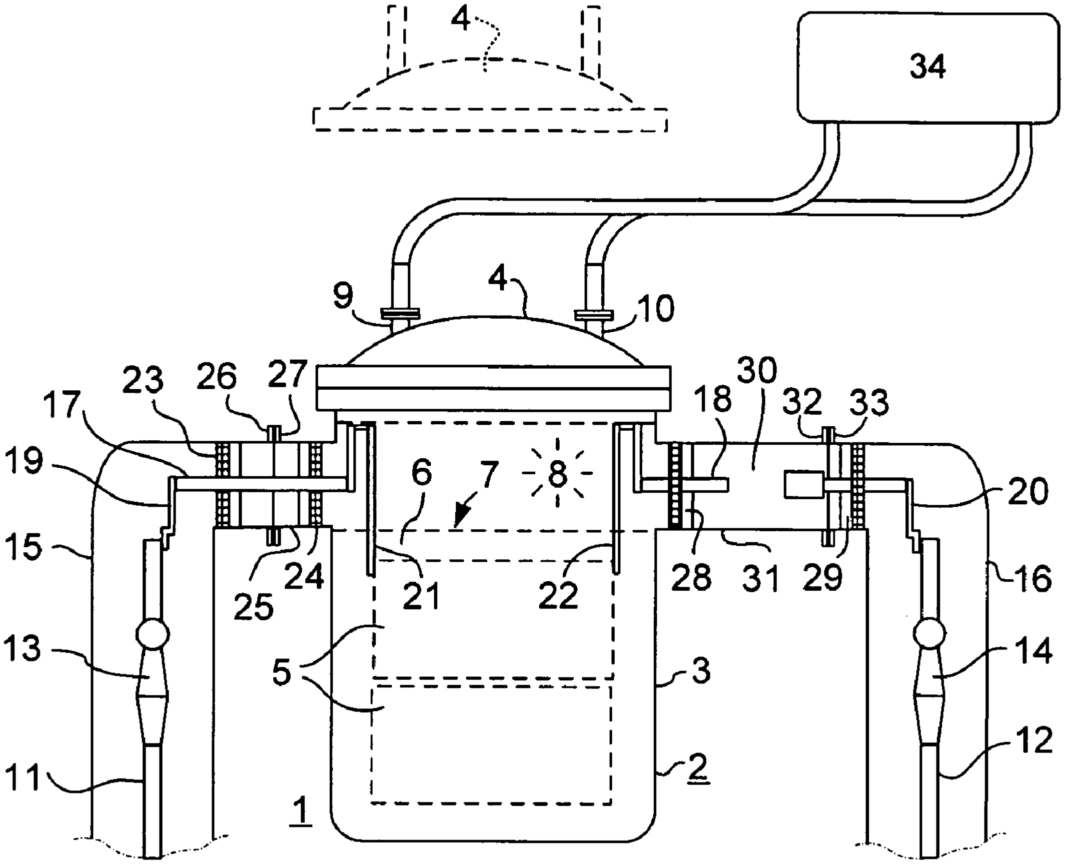
FIG. 1 is a side elevation of a first embodiment of a current limiter according to the invention particularly adapted for the use with cables.

Referring to FIG. 1 of the drawings, a current limiter 1 comprises a cryogenic vessel 2 having a main body 3 and a cover 4. In the manner known with prior art current limiters superconducting elements 5 are immersed in a volume 6 of a coolant such as liquefied nitrogen the level of which is designated by numeral 7. Above the level 7 and beneath the cover 4 there is an ullage space 8. The cover 4 is fitted with pipes 9 and 10 for filling coolant into the vessel 2 and for controlling pressure. There may be provided further pipes or ducts in the cover 4 if necessary or appropriate depending on a suitable type of a coolant supply system provided for the operation of the current limiter. For the purpose of illustration a coolant supply system 34 is shown as a unit in FIG. 1. The mentioned cryogenic components external of vessel 2 are not shown in FIG. 2 so as to simplify the drawing.

In the current limiter according to FIG. 1 connections to a current path to be protected against a fault current are made by cables 11 and 12 the terminations 13 and 14 of which respectively are placed in housings 15 and 16. Whereas the orientation of the terminations 13 and 14 is vertical conductors 17 and 18 associated to the terminations 13 and 14 are orientated horizontally and extend into the ullage space 8 of the vessel 2. Connectors 19 and 20 are provided for connecting terminations 13 and 14 to conductors 17 and 18. There are also provided inner connectors 21 and 22 for completing the current path through the cables 11 and 12 and the superconducting assemblies 5.

In the embodiment of FIG. 1 conductor 17 passes through disk-type bushings 23 and 24 the first of which is fitted to housing 15 and the latter of which is seated in a horizontal extension 25 of main body 3 of the vessel 2. Disk-type bushings 23 and 24 may be of a design applicable in high-voltage equipment and may be adapted to the use with temperatures existing in superconducting systems by proper choosing of materials. Housing 15 is joined to extension 25 by means of flanges 26 and 27. On the side of the vessel 2 opposite to conductor 17 there are provided two more disk-type bushings 28 and 29 the distance of which is chosen to accommodate in between a disconnecting switch 30 shown in the disconnected state. Also, the length of a further extension 31 of main body 3 is designed correspondingly. Housing 16 and extension 31 are joined in the same manner as already explained for extension 25 and housing 15 by means of a flange 32 fitted to extension 31 and flange 33 fitted to housing 16. Conveniently, in disconnecting switch 30 there is provided an axially moving contact for interrupting or closing conductor 18.

Figure 2:
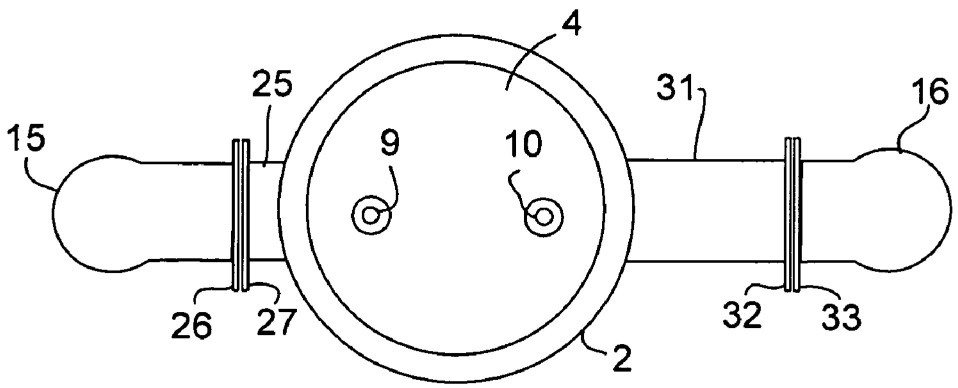
FIG. 2 is a top view of the current limiter shown in FIG. 1, with cryogenic components external of the limiter cut off.

As will be noted by comparing FIGS. 1 and 2 the vessel 2 is mainly cylindrical with a circular cross section and the bushings 23 and 24 are positioned on opposed wall parts so that the associated conductors 17 and 18 enter into the ullage space 8 underneath the cover 4. Thus, cover 4 may easily be removed as is shown in phantom in FIG. 1 without the need to dismantle the electrical connections between cables 11 and 12 and superconducting elements 5. In case flexible pipes or hoses are used for connecting a coolant supply system 34 with pipes 9 and 10 seated in cover 4 it may even be sufficient to remove voltage from the current limiter by actuating disconnecting switch 30 and to cut off coolant supply system 34 prior to removing cover 4. This will at least allow for an inspection of the interior of vessel 2.

The current limiter shown in FIGS. 1 and 2 is a one-pole unit so that in a conventional three-phase system three identical units are used. This configuration is particularly applicable to systems having a rated voltage of 110 kV or above. In the lower range of rated voltages between 6 kV and 60 kV a three-pole design already known for superconducting current limiters could be taken into consideration within the scope of the invention.

Figure 3:
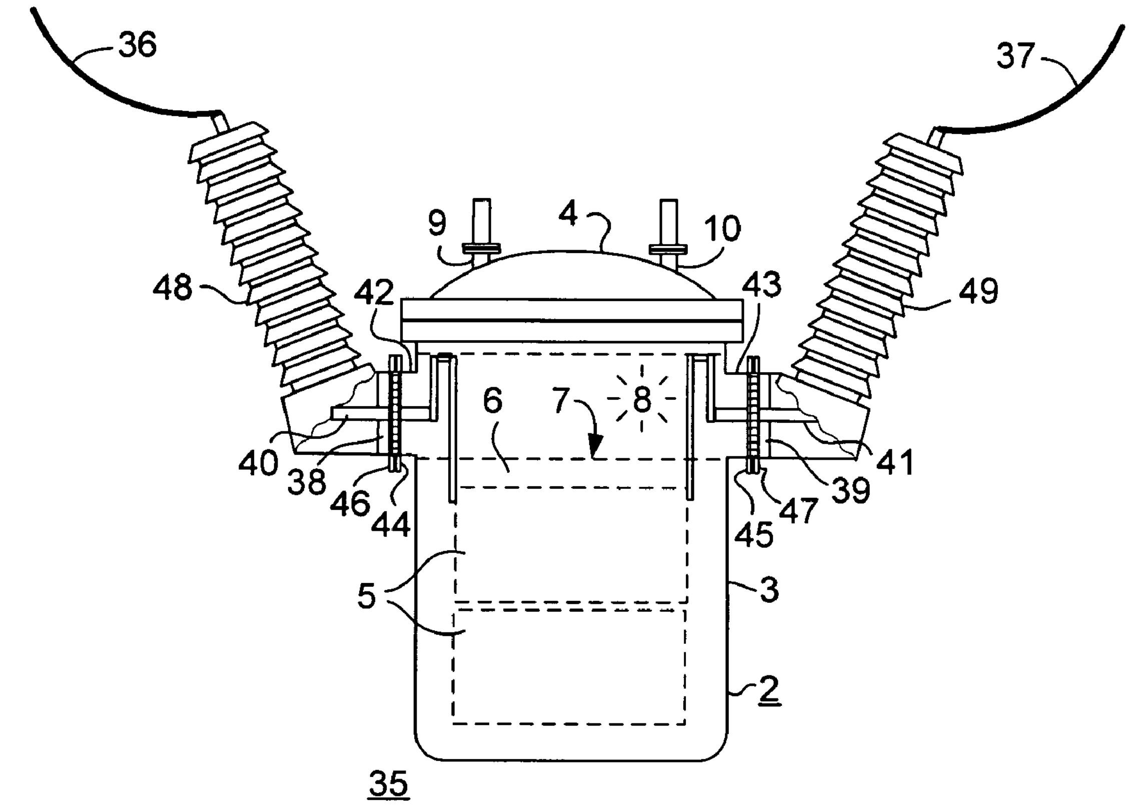
FIG. 3 shows a second embodiment of a current limiter useful for connection to overhead lines, also in a side elevation.
Figure 4:
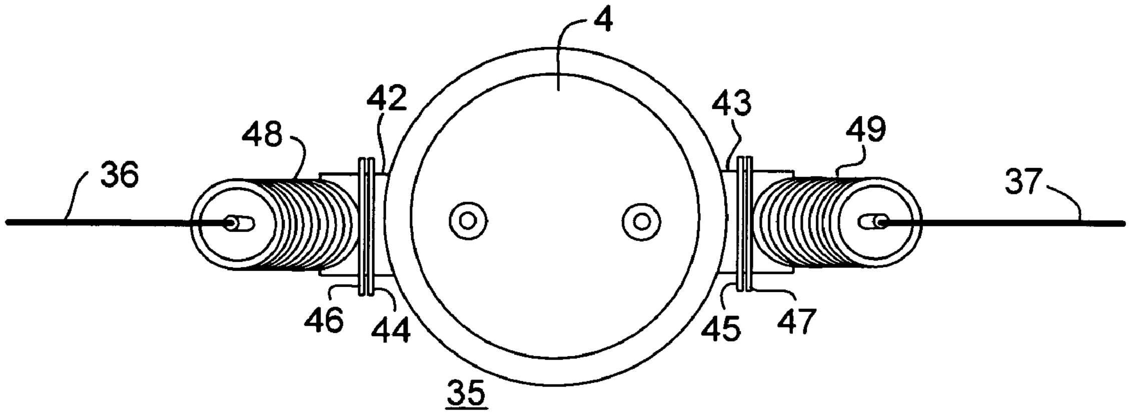
FIG. 4 is top view of the current limiter shown in FIG. 3 without cryogenic components external of the limiter.

A second embodiment of a current limiter 35 shown in FIGS. 3 and 4 is particularly adapted for the use with overhead lines indicated at 36 and 37. Vessel 2 with main body 3 and cover 4 of current limiter 35 correspond to FIGS. 1 and 2, so only features specific to the line-type application will now be described. As is the case with the embodiment shown in FIGS. 1 and 2 disk-type bushings 38 and 39 with associated conductors 40 and 41 are provided in opposite wall parts of main body 3 designed as extensions 42 and 43. Both extensions are fitted with a flange 44 and 45 respectively which correspond to flanges 46 and 47 of outdoor bushings 48 and 49 suitable for high-voltage applications. Bushings 48 and 49 are shown positioned with a certain inclination but could also be arranged vertically.

Figure 5:
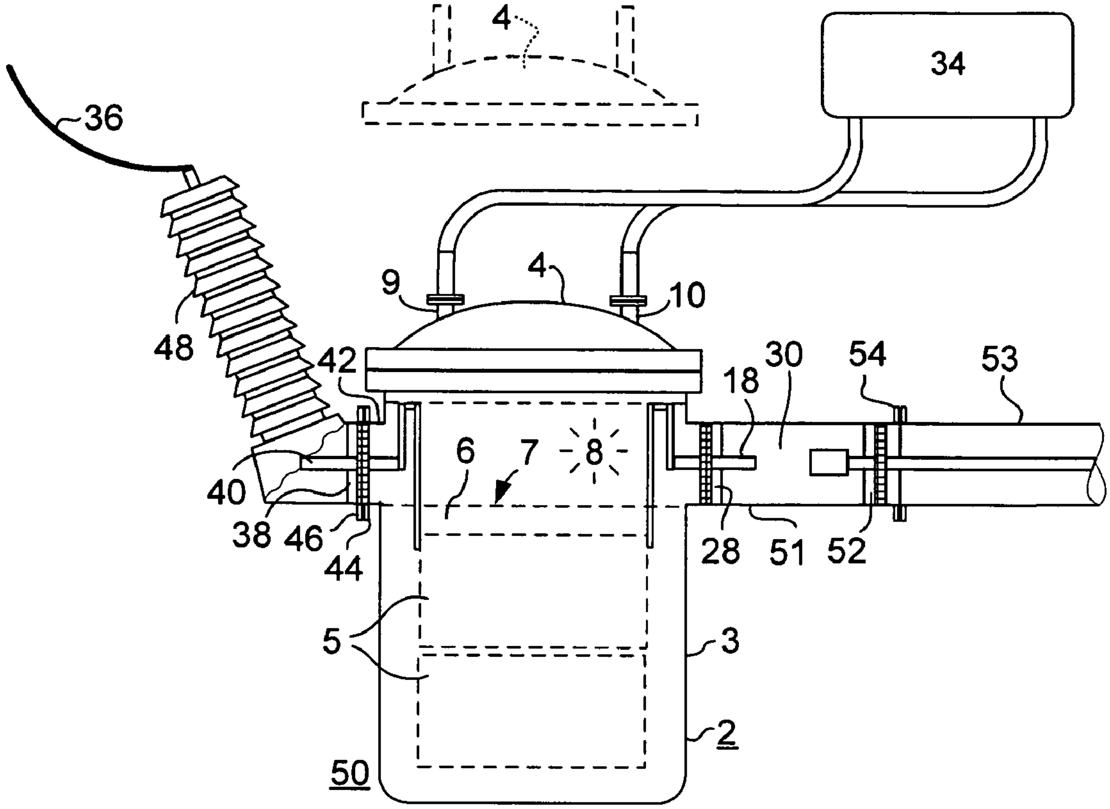
FIG. 5 is a side elevation of a third embodiment of a current limiter which is a coupling link between an overhead line and a gas-insulated substation.
Figure 6:
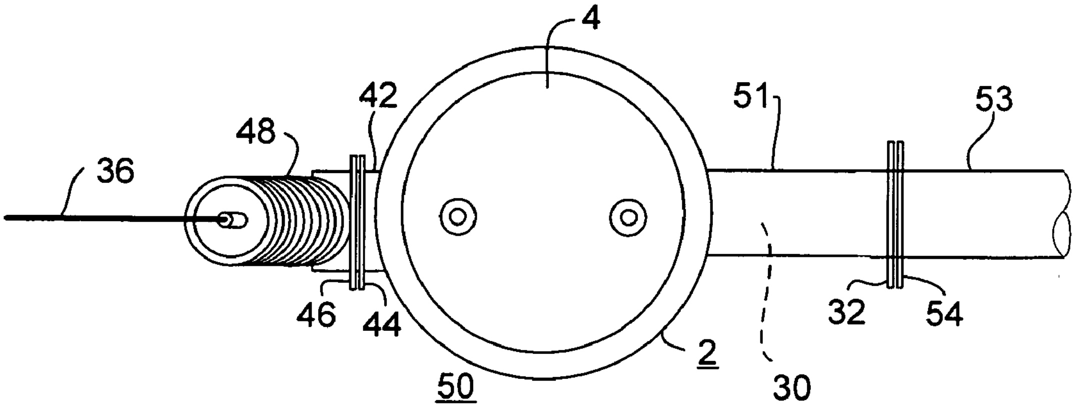
FIG. 6 is to view of the limiter shown in FIG. 5, external cryogenic components being omitted.

Also within the scope of the invention is a current limiter 50 according to FIGS. 5 and 6 which can be connected between an outdoor high voltage line and indoor equipment such as a cable termination or a gas-insulated substation. It is to be noted that the cryogenic vessel of limiter 50 and all components directly associated with the vessel are identical to those in the preceding figures and the respective reference numerals are used. Also, limiter 50 corresponds to limiter 35 in FIGS. 3 and 4 in that there is provided an outdoor bushing 48. All members associated to bushing 48 are identical to those in FIGS. 3 and 4, and the respective reference numerals are used in FIGS. 5 and 6.

On the side of limiter 50 opposite to outdoor bushing 48 there is a disconnecting switch 30 as described with reference to FIG. 1. As a particular feature of limiter 50 disconnecting switch 30 is contained in an extension 51 of vessel 2 closed by another disk-type bushing 52 so that the insulating atmosphere of disconnecting switch 30 is independent of a component 53 to be coupled to a flange 54 at the outer side of extension 51.

The invention claimed is:

1. An electric current limiter comprising:

a cryogenic vessel having a main body and a cover, both defining an inner space separated from a surrounding space;

superconducting elements of the HTSC type immersed in a cryogenic liquid contained in the inner space of the vessel;

an ullage space between the cryogenic liquid and the cover; and bushings with conductors extending from the inner space of the vessel to the surrounding space, the conductors connecting the superconducting assemblies with a current path to be protected against a fault current, wherein the bushings are positioned in an area of the main body of the vessel surrounding the ullage space underneath the cover and wherein the cover is removable, and wherein said bushings are positioned in opposed wall parts of the main body of the cryogenic vessel, such wall parts of the main body designed as cylindrical extensions housing the bushings and that a flange is provided at the end of each extension for coupling ongoing electrical equipment.

2. The electric current limiter according to claim 1, wherein the conductors of the bushings extend horizontally into the ullage space.

3. The electric current limiter according to claim 1, wherein the flange of one of the extensions is adapted to a component for outdoor use and the flange of the other extension is adapted to indoor equipment.

4. The electric fault current limiter according to claim 1, wherein the bushings are disk-type elements with concentrically arranged inner conductors.

* * * * *